(12) United States Patent  
Nangia et al.

(10) Patent No.: US 8,400,951 B2
(45) Date of Patent: Mar. 19, 2013

(54) PHICH RESOURCE SIGNALING IN A WIRELESS COMMUNICATION SYSTEM

(75) Inventors: Vijay Nangia, Algonquin, IL (US); Robert T Love, Barrington, IL (US); Ravikiran Nory, Palatine, IL (US)

(73) Assignee: Motorola Mobility LLC, Libertyville, IL (US)

( * ) Notice: Subject to any disclaimer, the term of this patent is extended or adjusted under 35 U.S.C. 154(b) by 278 days.

(21) Appl. No.: 12/410,449

(22) Filed: Mar. 24, 2009

(65) Prior Publication Data

US 2010/0246455 A1    Sep. 30, 2010

(51) Int. Cl.
*H04J 3/00* (2006.01)

(52) U.S. Cl. ........ 370/280; 370/329; 370/281; 370/252; 714/748

(58) Field of Classification Search .......... None
See application file for complete search history.

(56) References Cited

FOREIGN PATENT DOCUMENTS

WO    WO 2009022879 A2 *  2/2009

OTHER PUBLICATIONS

R1-081326, "Indication of PHICH resource for TDD", Mar. 31-Apr. 4, 2008, 3GPP TSG RAN WG1 meeting #52bis.*
3GPP TS36.211v8.5.0 (Dec. 2008) Technical Specification Group Radio Access Network; Evolved Universal Terrestrial Radio Access(E-UTRA); Physical Channels and Modulation (Release 8).
3GPP TS 36.331 v8.4.0 (Dec. 2008) Technical Specification Group Radio Access Network; Evolved Universal Terrestrial Radio Access (E-UTRA); Radio Resource Control (RRC); Protocol Specification (Release 8).
3GPP TSG RAN1 #52, Sorrento, Italy, Feb. 11-15, 2008; PHICH Resource Signaling for TDD & FDD; R1-080729.
3GPP TSG RAN WG1 Meeting #52, Sorrento, Italy, Feb. 11-15, 2008; PHICH and Mapping to PHICH Groups; R1-080927.
3GPP RAN WG1 #52; Sorrento, Italy, Feb. 11-15, 2008; Way Forward on PHICH Allocation; R1-081071.

* cited by examiner

*Primary Examiner* — Kibrom T Hailu

(57) ABSTRACT

A wireless communication terminal and method for determining a number of Physical Hybrid ARQ Indicator Channel (PHICH) groups (N) in the downlink subframe based on a first parameter, a second parameter and a determined cyclic prefix (CP) duration, wherein the first parameter indicates a downlink system bandwidth in terms of a number of resource blocks and the second parameter indicates a scaling factor. The terminal receives downlink control signaling in a set of resource elements in the subframe, wherein the set of resource elements is determined based partly on the number of PHICH groups (N).

8 Claims, 5 Drawing Sheets

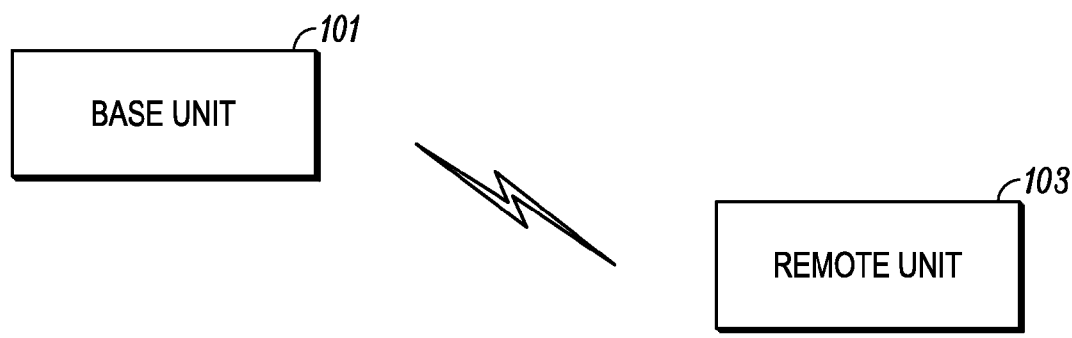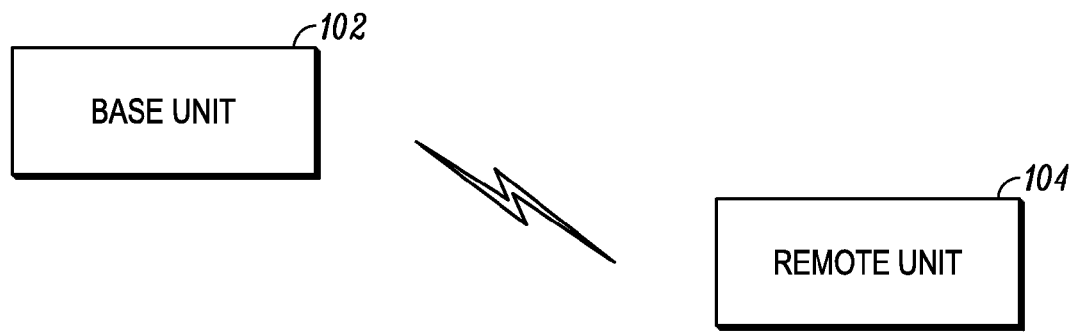
*FIG. 1*

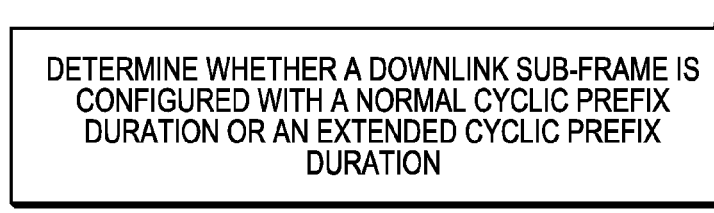
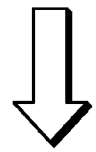
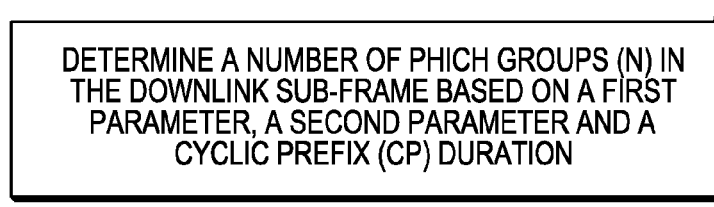
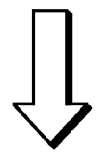
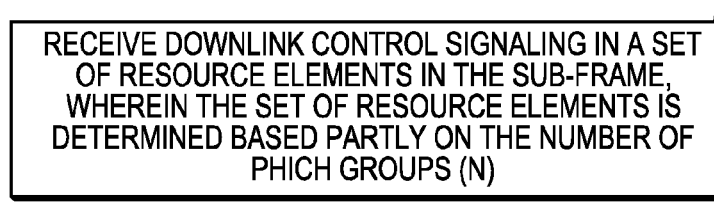
*FIG. 5*
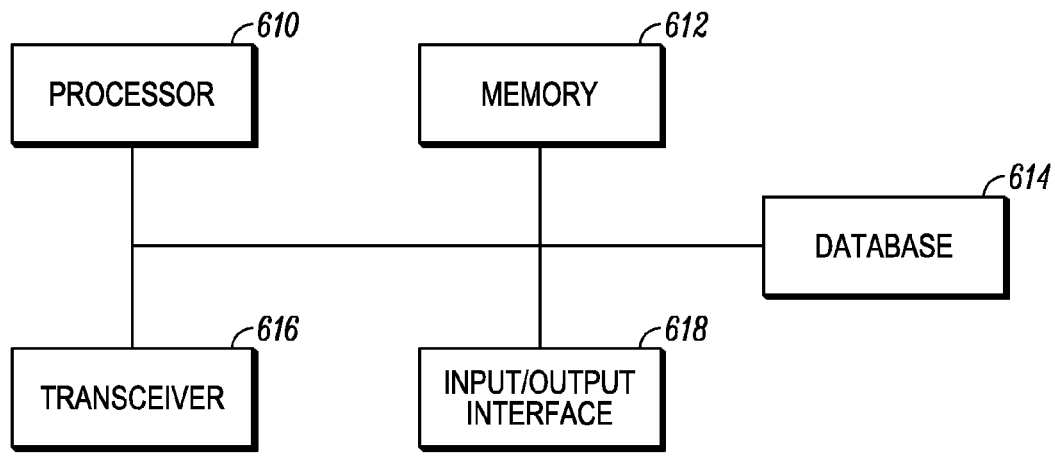
*FIG. 6*

PHICH RESOURCE SIGNALING IN A WIRELESS COMMUNICATION SYSTEM

FIELD OF THE DISCLOSURE

The present disclosure relates generally to wireless communications and, more particularly, to Physical Hybrid Automatic Repeat Request Indicator Channel (PHICH) resource signaling to wireless terminals in wireless communication systems.

BACKGROUND

In the Third Generation Partnership Project (3GPP) Long Term Evolution (LTE) wireless communication networks, Hybrid Automatic Repeat Request (HARQ) Acknowledgement/Negative Acknowledgement (ACK/NACK) signaling corresponding to uplink (UL) transmissions is sent on the Downlink using a Physical Hybrid ARQ Indicator Channel (PHICH). The PHICHs are linked to the UL transmission Resource Block (RB) and grouped into PHICH groups of 8 PHICH for a normal cyclic Prefix (CP) and PHICH groups of 4 for an extended CP. The PHICH structure occupies an integer multiple of three REGs (REG=RE Groups with 4 data REs) with each group of 3 PHICH REGs supporting 8 PHICH or 1 PHICH group for normal CP and 2 PHICH groups for extended CP. The amount of PHICH resources reserved in a subframe by the network is configurable based on a 2-bit PHICH resource indicator Nh and the system bandwidth that is signaled on the P-BCH. The PHICH resource indicator indicates an integer number of PHICH groups.

3GPP R1-081071 describes the PHICH allocation scheme that is linked to the UL Physical Resource Block (PRB). It also puts a limit on the maximum value for the PHICH groups as ceil(N_PRB/4). 3GPP LTE however has not defined the dimensioning of the number of PHICH groups and the values for the 2-bit PHICH resource indicator Nh. Thus, there is a need for a mapping function for an appropriate PHICH group provisioning and for defining the signaling for PHICH resources for time division duplex (TDD) and frequency division duplex (FDD) including HD FDD. For TDD it is necessary to account for different TDD frame UL/DL multiplexing options when defining PHICH resource signaling.

The various aspects, features and advantages of the invention will become more fully apparent to those having ordinary skill in the art upon a careful consideration of the following Detailed Description thereof with the accompanying drawings described below. The drawings may have been simplified for clarity and are not necessarily drawn to scale.

BRIEF DESCRIPTION OF THE DRAWINGS

FIG. 1 illustrates a wireless communication system.

FIG. 5 illustrates a process diagram.

FIG. 6 illustrates a wireless communication terminal.

DETAILED DESCRIPTION

Figure 2:
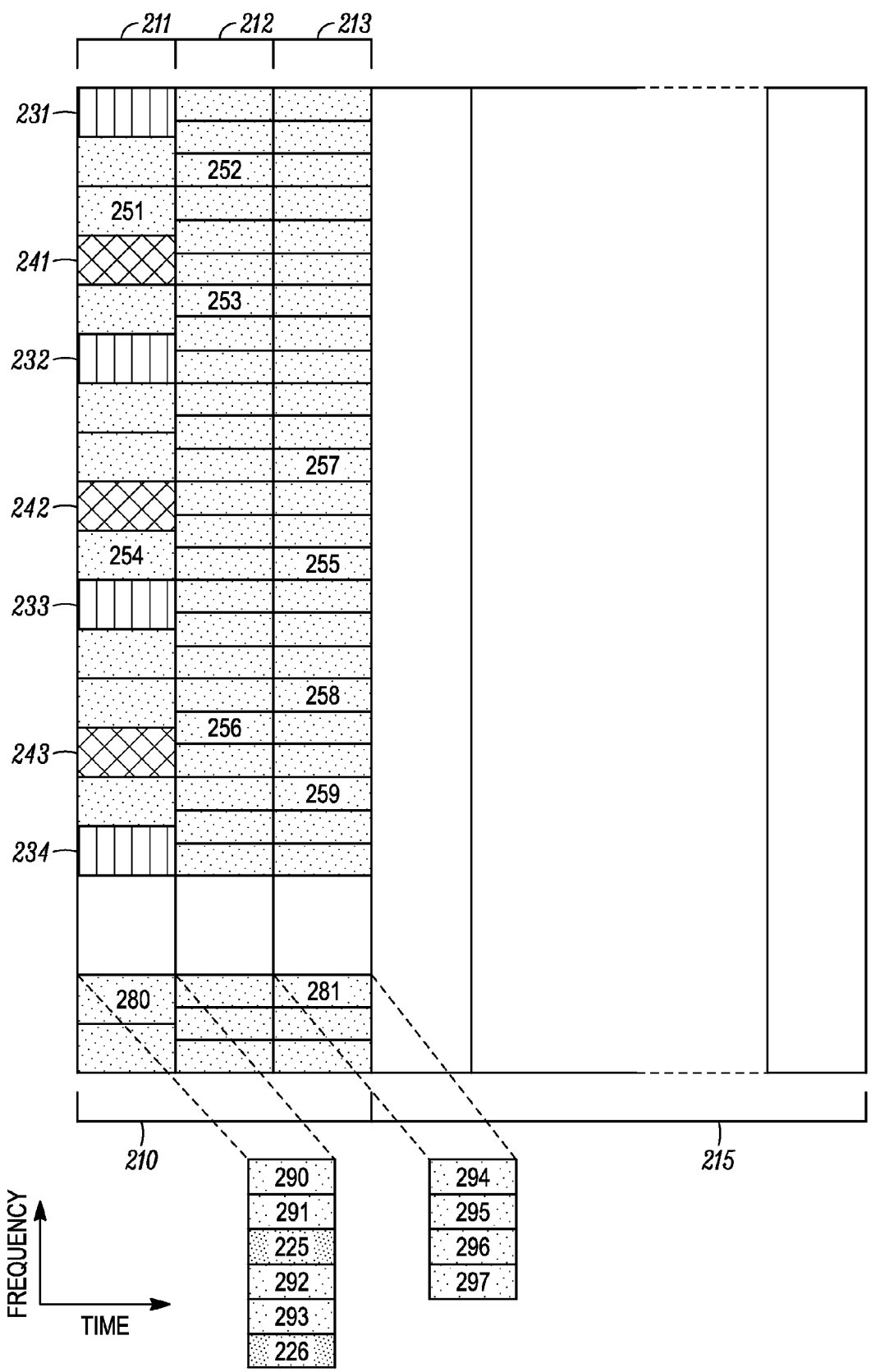
FIG. 2 illustrates a control signaling structure within a downlink subframe.

In FIG. 1, a wireless communication system 100 comprises one or more fixed base infrastructure units 101, 102 forming a network distributed over a geographical region for serving remote units in the time and/or frequency and/or spatial domain. A base unit may also be referred to as an access point, access terminal, base, base station, Node-B, eNode-B, Home Node-B, Home eNode-B, relay node, or by other terminology used in the art. The one or more base units each comprise one or more transmitters for downlink transmissions and one or more receivers for receiving uplink transmissions. The base units are generally part of a radio access network that includes one or more controllers communicably coupled to one or more corresponding base units. The access network is generally communicably coupled to one or more core networks, which may be coupled to other networks like the Internet and public switched telephone networks among others. These and other elements of access and core networks are not illustrated but are known generally by those having ordinary skill in the art.

In FIG. 1, the one or more base units serve a number of remote units 103, 104 within a corresponding serving area, for example, a cell or a cell sector, via a wireless communication link. The remote units may be fixed or mobile. The remote units may also be referred to as subscriber units, mobiles, mobile stations, users, terminals, subscriber stations, user equipment (UE), user terminals, wireless communication devices, or by other terminology used in the art. The remote units also comprise one or more transmitters and one or more receivers. In FIG. 1, the base unit 101 transmits downlink communication signals to serve remote unit 103 in the time and/or frequency and/or spatial domain. The remote unit 104 communicates with base unit 102 via uplink communication signals. Sometimes the base unit is referred to as a "serving" or connected or anchor cell for the remote unit. The remote units may have half duplex (HD) or full duplex (FD) transceivers. Half-duplex transceivers do not transmit and receive simultaneously whereas full duplex terminals do. The remote units may also communicate with the base unit via a relay node.

In one implementation, the wireless communication system is compliant with the 3GPP Universal Mobile Telecommunications System (UMTS) LTE protocol, also referred to as EUTRA or Release-8 (Rel-8) 3GPP LTE or some later generation thereof, wherein the base unit transmits using an orthogonal frequency division multiplexing (OFDM) modulation scheme on the downlink and the user terminals transmit on the uplink using a single carrier frequency division multiple access (SC-FDMA) scheme. More generally the wireless communication system may implement some other open or proprietary communication protocol, for example, WiMAX, among other existing and future protocols. The disclosure is not intended to be implemented in any particular wireless communication system architecture or protocol. The architecture may also include the use of spreading techniques such as multi-carrier CDMA (MC-CDMA), multi-carrier direct sequence CDMA (MC-DS-CDMA), Orthogonal Frequency and Code Division Multiplexing (OFCDM) with one or two dimensional spreading. The architecture in which the features of the instant disclosure are implemented may also be based on simpler time and/or frequency division multiplexing/multiple access techniques, or a combination of these various techniques. In alternate embodiments, the wireless communication system may utilize other communication system protocols including, but not limited to, TDMA or direct sequence CDMA. The communication system may be a TDD (Time Division Duplex) or FDD (Frequency Division Duplex) system.

Figure 3:
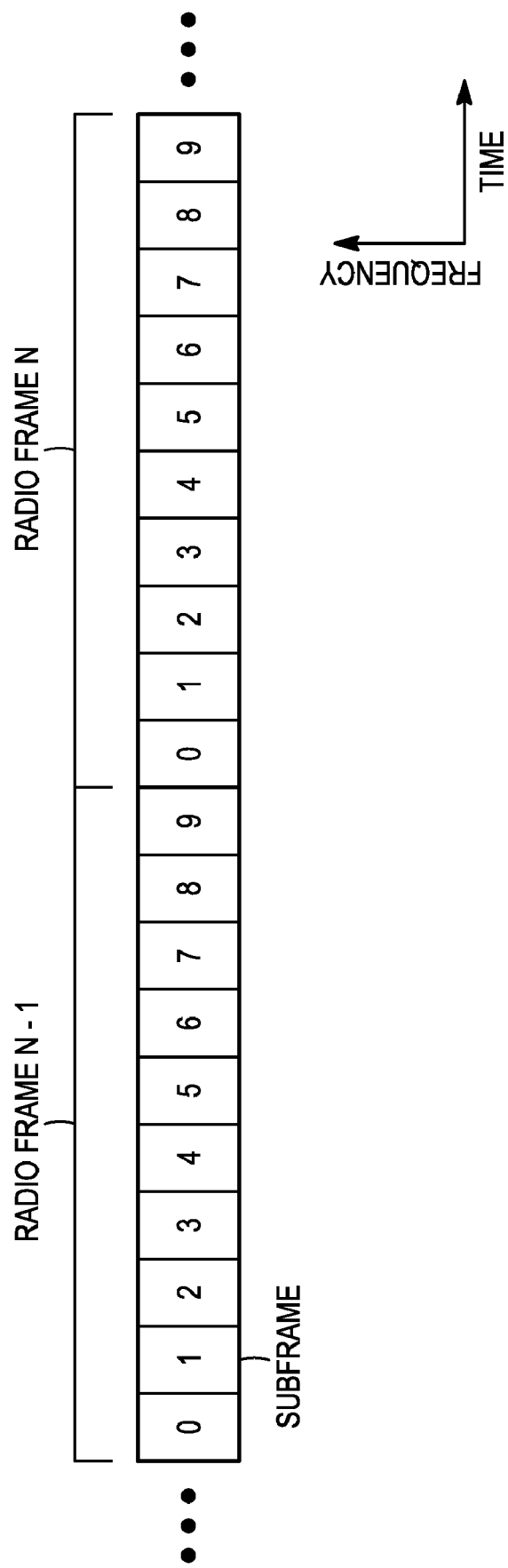
FIG. 3 illustrates downlink radio frames wherein each downlink radio frame comprises multiple subframes.

FIG. 2 illustrates an exemplary downlink subframe 200 suitable for use in a 3GPP LTE Rel-8 wireless communication system. In FIG. 1, such a downlink subframe is typically transmitted from the base unit 101 to the remote units 103. The subframe typically constitutes a radio frame in the time-frequency domain. FIG. 3 illustrates multiple downlink radio frames wherein each downlink radio frame comprises multiple subframes. A subframe comprises one or more slots with each slot comprising a plurality of symbols. In 3GPP LTE Rel-8, a subframe comprises two slots with each slot comprising of 7 OFDM symbols in the case of a normal cyclic prefix duration and 6 OFDM symbols in the case of an extended cyclic prefix duration.

In FIG. 2, the subframe 200 includes a control region 210 and a data region 215. This subframe 200 includes three Orthogonal Frequency Division Multiplex (OFDM) symbols 211, 212, 213 in the control region 210. Other subframes may have one, two, three or more symbols in the control region. Resource elements (REs) in the control region 210 are used to signal control information to the remote units (UEs) in the system. A Resource Element (RE) may correspond to a subcarrier for a duration of one OFDM symbol. Within the control region 210, resource element groups are used for control signaling. A resource element group (REG) is a set of REs and may contain REs that are mapped for transmission of control signaling. The REG may also contain REs that are mapped for transmission of control signaling and REs mapped for the transmission of reference signals. In FIG. 2, REGs in the first OFDM symbol 211 contain REs mapped for transmission of control signaling and reference signals. REGs in the second OFDM symbol 212 and the third OFDM symbol 213 contain REs that are mapped for transmission of control signaling only. For example, REG 280 in the first OFDM symbol 211 has six REs where REs 290, 291, 292, 293 are mapped for transmission of control signaling and REs 225 and 226 are mapped for transmission of reference signals. REG 281 in the second OFDM symbol 212 has four REs where REs 294, 295, 296, 297 are mapped for transmission of control signaling and no REs are mapped for transmission of reference signals.

In FIG. 2, REGs 231, 232, 233, 234 are mapped for a control channel called Physical Control Format Indicator Channel (PCFICH). The PCFICH carries information about the number of OFDM symbols used for transmission of a Physical Downlink Control Channel (PDCCH) in a subframe. The PCFICH is transmitted when the number of OFDM symbols for the PDCCH is greater than zero. REGs 241, 242, 243 are mapped for Physical Hybrid ARQ Indicator Channel (PHICH) signaling. More generally, a plurality of REGs within the control region of a subframe can be mapped for PHICH signaling. The PHICH carries hybrid-ARQ ACK/NACK signals for uplink transmissions by various UEs in the network. A set of three REGs are combined to create a PHICH group for a subframe configured with normal Cyclic Prefix (CP). A set of 3 REGs are combined to create two PHICH groups for a subframe configured with an extended cyclic prefix. Eight separate hybrid-ARQ ACK/NACK signals are multiplexed within each PHICH group for a normal cyclic prefix and four separate hybrid-ARQ ACK/NACK signals are multiplexed within each PHICH group for an extended cyclic prefix. REGs 251, 252, 253, 254, 255, 256, 257, 258, 259 are mapped for Physical Downlink Control Channel (PDCCH) signaling. More generally, a plurality of REGs within the control region of a subframe can be mapped for PDCCH signaling. REGs mapped for PDCCH signaling can be interleaved and are grouped into subsets with each set comprising a plurality of REGs and each set corresponds to a Control Channel Element (CCE). In 3GPP LTE Rel-8 a CCE contains nine REGS. PDCCH control signaling can be transmitted on a single or a plurality of CCEs. The PDDCH carries downlink resource assignment information for UEs within the network.

Figure 4:
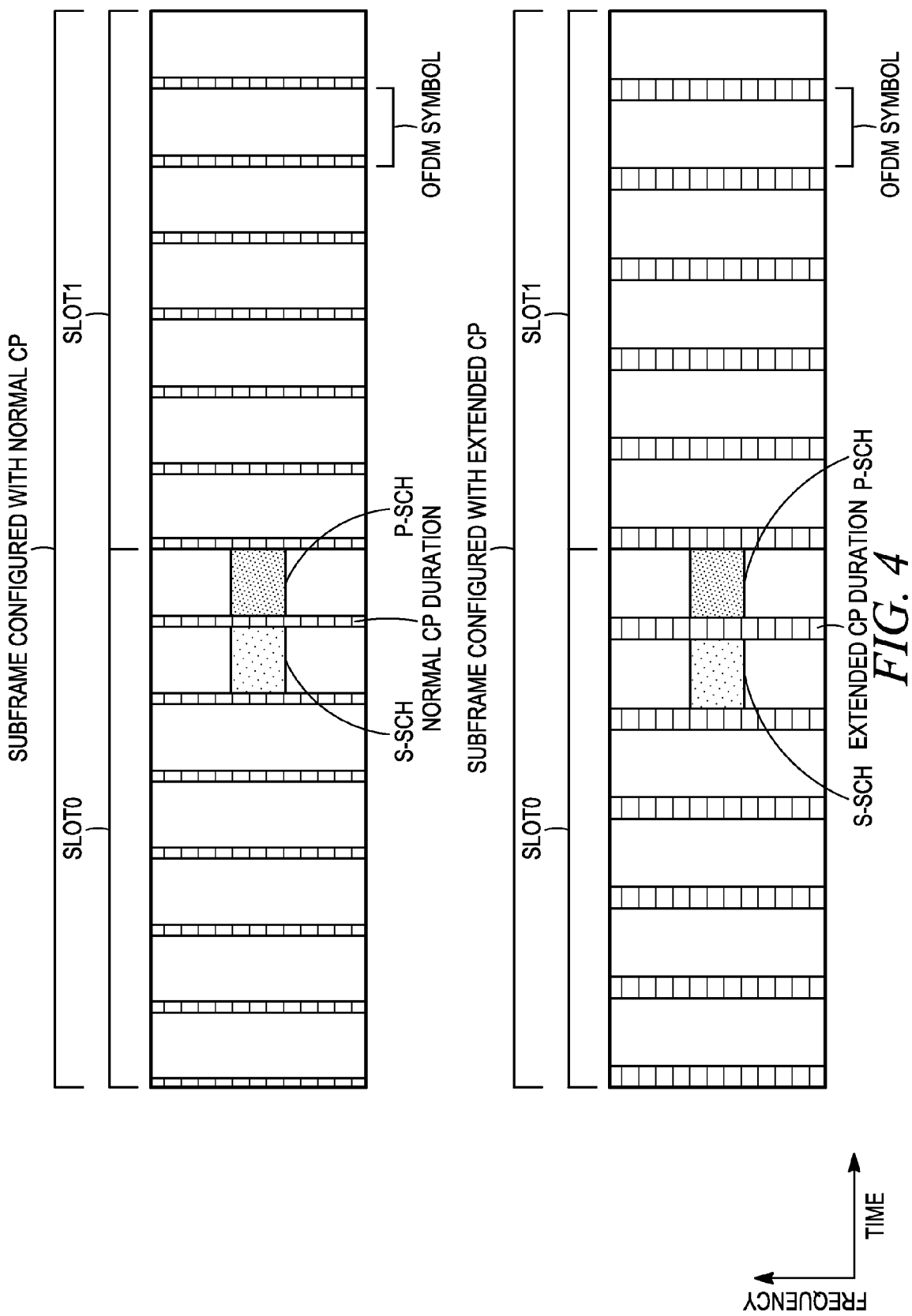
FIG. 4 illustrates a subframe configured with a normal cyclic prefix (CP) duration and a subframe configured with an extended cyclic prefix duration.

FIG. 4 illustrates a 3GPP LTE Rel-8 subframe configured with a normal CP duration and a subframe configured with an extended CP duration. In frequency division duplexing (FDD) mode, the base unit transmits a Primary Synchronization Signal (P-SCH) in the last OFDM symbol of slot 0 within the subframe index 0 and 5 of the radio frame. The base unit also transmits a Secondary Synchronization Signal (S-SCH) in the penultimate OFDM symbol of slot 0 within the subframe index 0 and 5 of the radio frame. In time division duplexing (TDD) mode operation, the P-SCH is transmitted in the third OFDM symbol of slot 0 in subframes 1 and 6, while the S-SCH is transmitted in the last OFDM symbol of slot 1 in subframes 0 and 5. As illustrated, the time offset between P-SCH and S-SCH transmission varies with the duration of the CP. A UE can therefore determine the cyclic prefix configuration of a subframe by receiving P-SCH transmissions and S-SCH transmissions and estimating the time offset between them.

In one aspect of the disclosure, PHICH resource signaling is defined for TDD and FDD (including HD FDD). For TDD it is necessary to account for different TDD frame UL/DL multiplexing options when defining PHICH resource signaling. Another related issue addressed is the tradeoff between the maximum PHICH power borrowing from PDCCH constrained by the PHICH power boost limit (e.g. +6 dB) and the PHICH resource size.

It known generally that the PHICH can borrow power from PDCCH if an intra-Control Channel Element (CCE) power offset between the $1^{st}$ and $2^{nd}/3^{rd}$ OFDM control symbols is permitted. If not, then only intra-PHICH power borrowing is permitted which may require an increased PHICH resource size (i.e., more PHICH groups allocated) beyond 1 PHICH per PRB to guarantee sufficient power to achieve full coverage. A CCE contains multiple interleaved REGs. For example, in 3GPP LTE Rel-8 a CCE contains nine REGS. Given that intra-CCE power offsets are permitted, then PHICH resource size can be chosen based on maximum UEs scheduled per subframe or at most to allow approximately 1 PHICH per PRB.

Table 1 below shows the maximum power that can be borrowed by PHICH from PDCCH resources given the PHICH and PDCCH resource size (in REs) and the maximum power boost limit (e.g., +6 dB). As shown, the smaller the PHICH resource the smaller the amount of power that can be borrowed before the boost limit of +4 or +6 dB is exceeded. The boost limit is determined by EVM and AGC headroom requirements. All PHICH REs are boosted by +4 or +6 dB as provided in Table 1.

TABLE 1

PHICH Power Borrowing Limit for different PHICH Power Boost Limits

| | | Power Borrowing Limit as % PDCCH Power | |
|---|---|---|---|
| PHICH (#REs) | PDCCH (#REs) | +4 dB PHICH Boost Limit | +6 dB PHICH Boost Limit |
| 12 | 172 | 10.5 | 20.9 |
| 24 | 160 | 22.5 | 45.0 |
| 36 | 148 | 36.5 | 73.0 |
| 48 | 136 | 52.9 | 100.0 |
| 50 | 134 | 56.0 | 100.0 |

A 2 or 3 dB intra-CCE power offset is required to enable PHICH power borrowing from PDCCH for up to about 50% to 60% power borrowing. For deployment case 3 about a 9 dB power boost is required to achieve cell edge coverage for a given PHICH. Deployment Case 3 is a 19 cell site deployment with a cell inter-site distance of 1732 meters, penetration loss (including body loss) of 20 dB and 3 km/h typical urban 6-ray channel model, wherein each cell site has 3 sectors (or cells) with one eNodeB per sector (cell). For example, for a 5 MHz LTE carrier then:

$P_{phich}$=Pmax/300/8 (no boost) where Pmax=20 Watts;

$P_{phich\_nomux=Pmax}$300/2 (only 4 PHICHs allocated power with 1 PHICH of cell edge UE getting half and the other 3 PHICH getting other half of power for each of the 12 REs making up the PHICH group;

$P_{phich\_nomux\_borrow}$=2*Pmax/300/2 (another +3 dB boost to achieve cell edge coverage is obtained by borrowing power from PDCCH. Also any power needed by other PHICHs can be borrowed from PDCCH).

Normally at most (assuming #MU-MIMO+#non MU-MIMO users<$N_{RB}^{DL}$) only one PHICH per PRB needs to be allocated for a given LTE carrier. Fewer if PUCCH resources are accounted for. However, given that 4 PHICHs are lost from a PHICH group (for the normal CP duration case) serving a cell edge UE then additional PHICH groups are required. If, for 5 MHz, at most 3 cell edge UEs need PHICH signaling per subframe then another 2 PHICH groups are needed in addition to the number needed to achieve ~1 PHICH per PRB. For 5 MHz it is therefore estimated that 5/3 more PHICH groups are needed for a heavily loaded cell with significant VoIP traffic.

According to one aspect of the disclosure, in FIG. 5, at 510, the UE determines whether the downlink subframe is configured with a normal CP duration or with an extended CP duration. As mentioned above, the UE can determine the CP duration from the synchronization signals, i.e., by estimating the time difference between the received P-SCH signal and S-SCH signal. The UE can make this determination once during the initial cell search and synchronization stage. At 520, a UE determines a number of PHICH groups (N) in the downlink subframe based on a first parameter, a second parameter and the CP duration. As noted above, in 3GPP LTE systems, the CP duration may be determined by receiving P-SCH and S-SCH transmissions and estimating the time offset therebetween. The first parameter indicates a downlink system bandwidth in terms of a number of resource blocks and the second parameter indicates a scaling factor. At 530, the UE receives downlink control signaling in a set of resource elements in the subframe, wherein the set of resource elements is determined based partly on the number of PHICH groups (N).

In one particular implementation, the downlink control signaling in the set of resource elements in the downlink subframe comprises a physical downlink control channel (PDCCH) and/or a PHICH, and the set of resource elements is determined based on the number of PHICH groups (N) and a PHICH duration (M).

In embodiments where the UE operates in a frequency division duplexing (FDD) mode, the number of PHICH groups (N) is determined using the following equation:

$$N = \begin{cases} \text{ceil}[N_h(N_{RB}^{DL}/8)] & \text{for normal } CP \\ 2*\text{ceil}[N_h(N_{RB}^{DL}/8)] & \text{for extended } CP \end{cases} \quad (1)$$

wherein the first parameter corresponds to $N_{RB}^{DL}$ and the second parameter corresponds to $N_h$ and ceil (x) is a ceiling function that rounds to the nearest integer greater than or equal to x. The first and second parameters are signaled to the UE by the network. For example, the first parameter ($N_{RB}^{DL}$), the second parameter ($N_h$), and the PHICH duration (M) may be signaled on a master information block (MIB) or some other message that is received by the UE using one or more bits. The master information block (MIB) is a system configuration message and a broadcast message. In 3GPP LTE Rel-8, the MIB is transmitted on the Physical Broadcast Channel (PBCH). In one particular implementation, the PHICH duration (M) is signaled by the MIB using 1 bit and the PHICH Allocation parameter $N_h$ is signaled via the MIB using 2-bits.

The second parameter ($N_h$) is a set of values indicative of a scaling factor corresponding to what fraction of maximum PHICH allocation is desired and is related to the system bandwidth $N_{RB}^{DL}$ and the carrier duplex type (TDD vs. FDD). In one implementation, the scaling factor is selected from a set of values comprising: ⅙; ½; 1; and 2. In one embodiment, 2-bits in the physical broadcast channel (PBCH) are defined for PHICH resource signaling as follows:

| 2 bits on PBCH | Nh |
|---|---|
| 00 | 2 |
| 01 | 1 |
| 10 | ½ |
| 11 | ⅙ |

In one embodiment, the minimum PHICH allocation is 3 REGs per control region. PHICH REG locations are assigned outside of the CCE randomization interleaver and are invariant to n (PCFICH) the control region size—the number of OFDM symbols used for transmission of a PDCCH in a subframe. The PHICH REG locations are dependent on $N_{RB}^{DL}$, M and $N_h$ and not dependent on PCFICH and hence the PHICH error rate is not dependent on PCFICH error rate. REG locations for CCEs (that carry PDCCH control signaling) are determined by N and M when M=2 or 3 and n, N, and M, when M=1. The UE uses information about the REG mapping for PHICH to determine the REG mapping for PDCCH. In each subframe, REGs not mapped for PCFICH (fixed mapping based on system bandwidth) and PHICH (configurable mapping based on the formula above) are first interleaved and then mapped for PDCCH.

In embodiments where the UE operates in a time division duplexing (TDD) mode, the UE determines a position of the downlink subframe within a radio frame comprising a plurality of subframes. The UE determines whether the downlink subframe includes PHICH groups (N) based on a position of the downlink subframe within a radio frame wherein the radio frame comprises a plurality of subframes. The UE determines the number of PHICH groups (N) in the downlink subframe based on the position of the downlink subframe in the radio frame and based on an uplink/downlink configuration of the radio frame. For TDD mode operation, the UE determines the number of PHICH groups (N') using a modified version of equation (1) above as follows:

$$N' = \begin{cases} k*\text{ceil}[N_h(N_{RB}^{DL}/8)] & \text{for normal } CP \\ k*2*\text{ceil}[N_h(N_{RB}^{DL}/8)] & \text{for extended } CP \end{cases} \quad (2)$$

That is, $$N' = \begin{cases} k*N & \text{for normal } CP \\ k*N & \text{for extended } CP \end{cases}$$

wherein the first parameter corresponds to $N_{RB}^{DL}$ and the second parameter corresponds to $N_h$, and k is a scaling factor based on the position of the downlink subframe in the radio frame for the uplink/downlink configuration. In one implementation, the scaling factor, k, is selected from a set of values comprising: 0; 1; and 2. The scaling factor k=0 corresponds to no PHICH resources configured in the downlink subframe. The scaling factor, k=1 corresponds to the same number of PHICH groups configured in the downlink subframe as in the FDD mode. The scaling factor k=2 corresponds to twice the number of PHICH groups configured in the downlink subframe compared to the FDD mode.

In the case of FDD, all DL subframes are configured with N PHICH groups based on the signaled 2 bits. In the case of TDD, only the specified DL subframes (shown below) are provisioned with PHICH resources (N PHICH groups corresponding to k=1) indicated by the 2 bits. Further in the case of 3GPP LTE TDD configuration C0, subframes 0 and 5 are configured with 2N PHICH groups corresponding to k=2 (if the 2 bits on PBCH indicate N PHICH groups) as shown below.

| Configuration | Number of HARQ process | DL Subframes with PHICH Resource (and UL Scheduling Grants) |
| --- | --- | --- |
| C0 (1DL + DwPTS:3UL) | 7 | 0, 1, 5, 6 Note: subframes 0 and 5 are configured with twice the amount of PHICH resources signaled via PBCH |
| C1 (2DL + DwPTS:2UL) | 4 | 1, 4, 6, 9 |
| 2 (3DL + DwPTS:1UL) | 2 | 3, 8 |
| C3 (6DL + DwPTS:3UL) | 3 | 6, 7, 8 |
| C4 (7DL + DwPTS:2UL) | 2 | 7, 8 |
| C5 (8DL + DwPTS:1UL) | 1 | 8 |
| C6 (3DL + 2DwPTS:5UL) | 6 | 0, 1, 5, 6, 9 |

In FIG. 6, a wireless communication unit 600 comprises a controller/processor 610 communicably coupled to memory 612, a database 614, a transceiver 616, input/output (I/O) device interface 618 connected through a system bus 620. The wireless communication unit 600 may be implemented as a base unit or a remote unit and is compliant with the protocol of the wireless communication system within which it operates, for example, the 3GPP LTE Rel-8 or a later generation protocol discussed above. In FIG. 6, the controller/processor 610 may be implemented as any programmed processor. However, the functionality described herein may also be implemented on a general-purpose or a special purpose computer, a programmed microprocessor or microcontroller, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In FIG. 6, the memory 612 may include volatile and nonvolatile data storage, including one or more electrical, magnetic or optical memories such as a random access memory (RAM), cache, hard drive, read-only memory (ROM), firmware, or other memory device. The memory may have a cache to speed access to specific data. Data may be stored in the memory or in a separate database. The database interface 614 may be used by the controller/processor to access the database. The transceiver 616 is capable of communicating with user terminals and base stations pursuant to the wireless communication protocol implemented. In some implementations, e.g., where the wireless communication unit is implemented as a user terminal, the wireless communication unit includes an I/O device interface 618 that connects to one or more input devices that may include a keyboard, mouse, pen-operated touch screen or monitor, voice-recognition device, or any other device that accepts input. The I/O device interface may also connect to one or more output devices, such as a monitor, printer, disk drive, speakers, or any other device provided to output data.

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:

1. A method in a wireless communication terminal operating in a time division duplexing (TDD) mode, the method comprising:
   determining a number of Physical Hybrid ARQ Indicator Channel (PHICH) groups (N) in a downlink subframe using the following equation:

$$N = \begin{cases} k*\text{ceil}[N_h(N_{RB}^{DL}/8)] & \text{for normal } CP \\ k*2*\text{ceil}[N_h(N_{RB}^{DL}/8)] & \text{for extended } CP \end{cases}$$

wherein $N_{RB}^{DL}$ is a first parameter indicating a downlink system bandwidth in terms of a number of resource blocks, $N_h$ is a second parameter indicating a scaling factor, k is a scaling factor based on a position of the downlink subframe in a radio frame comprising a plurality of subframes, and CP is a cyclic prefix; and
   receiving downlink control signaling in a set of resource elements in the downlink subframe, wherein the set of resource elements is determined based partly on the number of PHICH groups (N).

2. The method of claim 1, the scaling factor, k, is selected from a set of values comprising: 0; 1; and 2.

3. The method of claim 1, determining the number of PHICH groups (N) in the downlink subframe based on the position of the downlink subframe in the radio frame and based on an uplink/downlink configuration of the radio frame.

4. The method of claim 1,
receiving a master information block (MIB), the MIB including the first parameter, the second parameter, and a PHICH duration (M),
determining the set of resource elements based on the number of PHICH groups (N) and the PHICH duration (M).

5. The method of claim 1, the scaling factor selected from a set of values comprising: ⅙; ½; 1; and 2.

6. The method of claim 1, the number of PHICH groups (N) is an integer for normal CP duration and an even integer for extended CP duration.

7. The method of claim 3,
determining the position of the downlink subframe comprising PHICH groups in the radio frame based on the determined uplink/downlink configuration,
wherein for uplink/downlink configuration 0, the determined position of the downlink subframe comprising PHICH groups include downlink subframes 0, 1, 5, 6 of the radio frame with the determined number of PHICH groups for downlink subframe 0 and 5 being twice that of the determined number of PHICH groups for downlink subframe 1 and 6.

8. The method of claim 3, determining the position of the downlink subframe comprising PHICH groups in the radio frame based on the determined uplink/downlink configuration,
wherein for TDD uplink-downlink configuration 1-6, the determined number of PHICH groups is the same for all determined positions of downlink subframes comprising PHICH groups in the radio frame.

* * * * *